United States Patent
Vandenbergh

(10) Patent No.: US 6,762,047 B2
(45) Date of Patent: *Jul. 13, 2004

(54) BACTERIAL PARTS WASHER, COMPOSITION AND METHOD OF USE

(75) Inventor: Peter A. Vandenbergh, Sarasota, FL (US)

(73) Assignee: Osprey Biotechnics, Inc., Sarasota, FL (US)

( * ) Notice: Subject to any disclaimer, the term of this patent is extended or adjusted under 35 U.S.C. 154(b) by 30 days.

This patent is subject to a terminal disclaimer.

(21) Appl. No.: 10/178,208

(22) Filed: Jun. 24, 2002

(65) Prior Publication Data

US 2003/0235904 A1 Dec. 25, 2003

(51) Int. Cl.$^7$ .................................................. C12N 1/20
(52) U.S. Cl. ............... 435/252.34; 435/262; 435/262.5; 435/876; 435/877; 210/611
(58) Field of Search .............. 435/262, 262.5, 435/262.34, 876, 877, 264; 210/611, 916

(56) References Cited

U.S. PATENT DOCUMENTS

| | | |
|---|---|---|
| 3,963,576 A | 6/1976 | Horsfall, III et al. |
| 4,349,633 A | 9/1982 | Worne et al. |
| 4,391,887 A | 7/1983 | Baumgarten et al. |
| 4,508,824 A | 4/1985 | Olsen |
| 4,672,037 A | 6/1987 | Daggett |
| 4,673,505 A | 6/1987 | Wong |
| 4,822,490 A | 4/1989 | Dyadechko et al. |
| 4,910,143 A | 3/1990 | Vandenbergh |
| 4,970,000 A | 11/1990 | Eppler et al. |
| 5,494,580 A | 2/1996 | Baskys et al. |
| 5,961,733 A | 10/1999 | Strange |
| 5,980,747 A | 11/1999 | Vandenbergh |
| 6,019,110 A | 2/2000 | McClure et al. |
| 6,044,854 A | 4/2000 | Marks |
| 6,074,491 A | 6/2000 | McClure et al. |
| 6,095,163 A | 8/2000 | McClure et al. |
| 6,248,234 B1 | 6/2001 | Cline |
| 6,318,387 B1 | 11/2001 | McClure et al. |
| 6,328,045 B1 | 12/2001 | Strange |
| 6,344,141 B1 * | 2/2002 | Vandenbergh et al. ...... 210/611 |
| 6,374,835 B1 | 4/2002 | McClure et al. |
| 6,387,874 B1 | 5/2002 | Schalitz et al. |

* cited by examiner

Primary Examiner—David A. Redding
(74) Attorney, Agent, or Firm—Ian C. McLeod

(57) ABSTRACT

A composition useful for cleaning and bioremediation applications is provided which comprises a Pseudomonas species, an alkali metal nitrate, an ethoxylate nonionic surfactant, and optionally monoammonium phosphate as a buffer in an aqueous solution. The Pseudomonas sp. is stable during storage of the composition.

23 Claims, No Drawings

US 6,762,047 B2

BACTERIAL PARTS WASHER, COMPOSITION AND METHOD OF USE

CROSS-REFERENCE TO RELATED APPLICATION

Not applicable.

STATEMENT REGARDING FEDERALLY SPONSORED RESEARCH OR DEVELOPMENT

Not applicable.

Reference to a "Computer Listing Appendix Submitted on a Compact Disc"

Not Applicable.

BACKGROUND OF THE INVENTION (1) Field of the Invention

The present invention provides an aqueous composition comprising a Pseudomonas species, an alkali metal nitrate, an ethoxylate nonionic surfactant, and optionally monoammonium phosphate as a buffer in an aqueous solution. The Pseudomonas sp. is stable during storage of the composition and the composition is useful for cleaning or bioremediation applications.

(2) Description of Related Art

The use of Pseudomonads for bioremediation of biodegradable materials is very well known. Illustrative of the patent art are U.S. Pat. No. 3,963,576 to Horsfall et al.; U.S. Pat. No. 4,391,887 to Baumgarten et al.; U.S. Pat. No. 4,508,824 to Olsen; U.S. Pat. No. 4,672,037 to Daggett; U.S. Pat. No. 4,673,505 to Wong; U.S. Pat. No. 4,822,490 to Dyadechko et al.; U.S. Pat. No. 4,910,143 to Vandenbergh; U.S. Pat. No. 4,970,000 to Eppler et al. and U.S. Pat. No. 5,494,580 to Baskys et al.

However, because the pseudomonad compositions are dried, such as by lyophilization, or frozen with preservatives, there is a significant die-off of the bacteria over time (usually about 75% by cell count) due to the preservation. Further, the cultures generally need to be reactivated in a bulk starter medium in order to increase the number and viability of the cells. The use of a bulk starter media for this purpose is well known to those skilled in the art. To circumvent the problem of die-off and to avoid the need for a bulk starter media, U.S. Pat. No. 5,980,747 to Vandenbergh discloses an aqueous pseudomonad composition which is storage-stable at room temperatures for storage, shipment, and use and yet immediately active without the use of a bulk starter.

In bioremediating a site or cleaning a surface, the microorganism culture suspension is applied to the site or surface in situ or in the case of some bioremediation activities, above ground. Commonly, in bioremediation, material from the site is combined with the cultured microorganism in a reaction vessel. Surfactants are usually added to the reaction vessel to reduce the surface tension of the contents of the reaction which facilitates contact between the material to be degraded and the microorganisms. Surfactants are also commonly used in bioremediation of a site or cleaning a surface. Thus, the cleaning ability of the microorganism-containing solution is principally attributed to the surfactant content in the reaction vessel. In general, microorganisms do not tolerate surfactants well. Therefore, for most bioremediation or cleaning applications, the microorganisms are stored separately from the surfactants (See U.S. Pat. No. 4,349,633 to Worne et al. for example).

However, it would be more convenient to provide a single composition that contains both the microorganisms and the surfactant. U.S. Pat. No. 6,387,874 to Schalitz et al. discloses a composition consisting of spores from the genus Bacillus in a mixture containing surfactants. The Bacillus spores have a long shelf life and protect the Bacillus from inactivation by surfactants. U.S. Pat. No. 6,248,234 to Cline provides a solid dissolvable bioactive element containing both surfactants and microorganisms.

In light of the above, there remains a need for an aqueous pseudomonad composition for cleaning or bioremediation which includes a surfactant and which is stable over long periods of time for storage, shipment, and use and yet immediately active without the use of a bulk starter. It would be further desirable that the composition be inexpensive to produce and store.

SUMMARY OF THE INVENTION

The present invention provides a composition useful for cleaning and bioremediation applications comprising a Pseudomonas species, an alkali metal nitrate, an ethoxylate nonionic surfactant, and optionally monoammonium phosphate as a buffer in an aqueous solution. The Pseudomonas sp. is stable during storage of the composition.

In particular, the present invention provides an aqueous composition containing a live bacterium of the genus Pseudomonas useful for degrading biological material comprising (a) water; (b) at least one species of the Pseudomonas at between about $10^6$ to $10^{10}$ CFU per mL of the water; (c) an ethoxylate nonionic surfactant; and (d) an alkali metal nitrate in an amount between about 0.1% and 5% by weight of the water and optionally a buffering amount of monoammonium phosphate so that the Pseudomonas species is preserved in a living form at 25° C.

In a preferred embodiment of the composition, the Pseudomonas species is a *Pseudomonas putida* and in particular, the *Pseudomonas putida* selected from the group consisting of *Pseudomonas putida* NRRL-B-18118, *Pseudomonas putida* NRRL-B-15078, and mixtures thereof. In particular embodiments, the composition further includes a *Pseudomonas fluorescens*, preferably, the *Pseudomonas fluorescens* deposited as NRRL-B-21658.

In a preferred embodiment of the composition, the alkali metal is sodium and when the monoammonium phosphate is included, it is included in a weight ratio between 1 to 1 and 125 to 1 alkali metal nitrate to monoammonium phosphate.

In further embodiment of the composition, the ethoxylate nonionic surfactant is a linear alcohol ethoxylate. Preferably, the ethoxylate nonionic surfactant is a (C9–C11) alkyl alcohol ethoxylate, CAS number 68439-46-3. It is preferable that the ethoxylate nonionic surfactant is at a concentration of between about 0.1% and 1%.

The present invention also provides a method for degradation of a biological material comprising (a) providing an aqueous composition which includes (1) water; (2) at least one species of the Pseudomonas at between about $10^6$ to $10^{10}$ CFU per mL of the water; (3) an ethoxylate nonionic surfactant; and (4) an alkali metal nitrate in an amount between about 0.1% and 5% by weight of the water and optionally a buffering amount of monoammonium phosphate so that the Pseudomonas species is preserved in a living form at 25° C.; (b) holding the composition at a temperature between about 8 and 35° C. to provide the preserved Pseudomonas species; (c) inoculating the preserved Pseudomonas species into the biodegradable material; and (d) degrading the biological material with the Pseudomonas species.

In a preferred embodiment of the method, the Pseudomonas species is a *Pseudomonas putida* and in particular, the *Pseudomonas putida* selected from the group consisting of *Pseudomonas putida* NRRL-B-18118, *Pseudomonas putida* NRRL-B-15078, and mixtures thereof. In particular embodiments, the method further includes a *Pseudomonas fluorescens,* preferably, the *Pseudomonas fluorescens* deposited as NRRL-B-21658.

In a preferred embodiment of the method, the alkali metal is sodium and when the monoammonium phosphate is included, it is included in a weight ratio between 1 to 1 and 125 to 1 alkali metal nitrate to monoammonium phosphate.

In further embodiment of the method, the ethoxylate nonionic surfactant is a linear alcohol ethoxylate. Preferably, the ethoxylate nonionic surfactant is a (C9–C11) alkyl alcohol ethoxylate, CAS number 68439-46-3. It is preferable that the ethoxylate nonionic surfactant is at a concentration of between about 0.1% and 1%.

OBJECTS

Therefore, it is an object of the present invention to provide an aqueous pseudomonad composition which is stable over long periods of time at room temperatures and in the presence of surfactants and which is immediately effective for cleaning or bioremediation applications.

It is a further object of the present invention to provide an aqueous pseudomonad composition that is inexpensive to prepare.

These and other objects of the present invention will become increasingly apparent with reference to the preferred embodiments.

DETAILED DESCRIPTION OF THE INVENTION

All patents, patent applications, government publications, government regulations, and literature references cited in this specification are hereby incorporated herein by reference in their entirety. In case of conflict, the present description, including definitions, will control.

The present invention provides an aqueous pseudomonad composition which comprises water; at least one species of the Pseudomonas at between about $10^6$ to $10^{10}$ CFU per mL of the water; an ethoxylate nonionic surfactant; and an alkali metal nitrate, preferably sodium nitrate, in an amount between about 0.1% and 5% by weight of the water and optionally a buffering amount of monoammonium phosphate, preferably in a weight ratio between 1 to 1 and 125 to 1 alkali metal nitrate to monoammonium phosphate, so that the Pseudomonas species is preserved in a living form at 25° C.

The composition disclosed herein is characterized by the unexpected finding that live pseudomonads such as *Pseudomonas putida* are stabile during storage in an aqueous solution containing an ethoxylate nonionic surfactant such as NEODOL 91-6 for periods of time up to at least 7 months. After 7 months, the cultures contain about 1 to $6 \times 10^6$ CFU per mL which is more than enough for the usual bioremediation and cleaning applications. It was further unexpected that the pseudomonads were able to degrade hydrocarbons in the presence of the ethoxylate nonionic surfactant. Further still, it was unexpected that the pseudomonads in a solution containing the ethoxylate nonionic surfactant would degrade hydrocarbons in a parts washer manufactured by the ChemFree Corporation (Norcross, Ga.).

The ethoxylated nonionic surfactant comprising the composition herein generally has a hydrophilic and/or hydrophobic portion that easily forms emulsions with the sewage material and/or grease or oils present by way of micelle formation. The hydrophilic portion preferably comprises at least one and preferably multiple polar ether linkages derived from polymerization of ethylene oxide and/or propylene oxide with the hydrophobe. The nonionic ethoxylate surfactant includes, but is not limited to, ethoxylated alkanolamides, ethoxylated alkanolamides, ethoxylated acids and oils, ethoxylated sorbitol esters, octyphenol aromatic ethoxylates, nonylphenol aromatic ethoxylates, dionylphenol aromatic ethoxylates, dodecylphenol aromatic ethoxylates, tristyphenol ethoxylates, isotridecyl alcohol ethoxylates, isodecyl alcohol ethoxylates, linear alcohol ethoxylates, oleyl alcohol ethoxylates, ethoxylated mercaptans, capped ethoxylates, nonylphenol ethoxylates, and/or mixtures thereof. In the composition disclosed herein, the ethoxylate nonionic surfactant or mixture of ethoxylate nonionic surfactants is preferably at a concentration of between about 0.1% and 5%, most preferably between about 0.1% and 1%.

The preferred ethoxylate nonionic surfactant comprising the composition disclosed herein is a linear alcohol ethoxylate. Most preferably, the linear alcohol ethoxylate is the (C9–C11) alkyl alcohol ethoxylate (polyethyleneglycol-(C9–C11)-ether) CAS number 68439-46-3 commonly available as NEODOL 91-6 from Shell Chemicals Canada, Ltd., Calgary, Alberta, and other sources.

The preferred pseudomonad comprising the composition disclosed herein is *Pseudomonas putida* NRRL-B-18118. The composition can comprise *Pseudomonas putida* NRRL-B-15078, either alone or in mixture with *Pseudomonas putida* NRRL-B-18118. Optionally, the composition can further include *Pseudomonas fluorescens,* preferably NRRL-B-21658. The pseudomonads are described in U.S. Pat. No. 4,508,824 to Vandenbergh and U.S. Pat. No. 4,508,824 to Olsen. The *Pseudomonas putida* strains are available upon request by name and deposit number from the Northern Regional Research Laboratory (NRRL), Peoria, Ill. *Pseudomonas fluorescens* was deposited under the terms of the Budapest Treaty on Feb. 21, 1997, as NRRL-B-21658. Preferably, the pseudomonads in the composition herein are each at a concentration of about $10^{10}$ to $10^6$ colony forming units (CFU) per mL.

The composition disclosed herein is particularly useful for bioremediation applications. The bioremediation can be conducted in a bioreactor or in the environment. In either event the composition is admixed with the soil, water, or the like waste or by-product material. At that point a carbon source (organic compound), nitrogen, vitamin, and mineral sources can also added to facilitate the bioremediation. This can compensate for the differences in the composition of biodegradable material being treated. The composition can also be used for degradation of nitrates.

The composition disclosed herein is also useful for removing oils, grease, solvents, and the like from the surfaces of parts using a parts washing system such as disclosed in U.S. Pat. Nos. 5,961,733 and 6,328,045, both to Strange, U.S. Pat. No. 6,044,854 to Marks, and U.S. Pat. Nos. 6,019,110 to McClure et al., 6,074,491 to McClure et al., 6,095,163 to McClure et al., 6,318,387 to McClure et al., and 6,374,835 to McClure et al.

Therefore, the composition disclosed herein is useful for a large range of environmental, industrial, and agricultural applications including wastewater treatment or cleanup, soil and groundwater remediation, agriculture cleanup (for example poultry waste), and consumer products such as cleaners and plumbing supplies.

The following examples are intended to promote a further understanding of the present invention.

EXAMPLE 1

The *Pseudomonas putida* NRRL-B-18118 was stabilized in a liquid according to the method described in U.S. Pat. No. 5,980,747 to Vandenbergh. Briefly, sodium nitrate was mixed with water in an amount of 0.26 gm per 100 gm (mL) of water. This produced a 0.26% solution by weight. To this solution, *Pseudomonas putida* NRRL-B-18118 was added in an amount to provide a final concentration of $1.4 \times 10^8$ CFU/mL of the pseudomonad and a final concentration of nitrate of 0.13%. Optionally, a buffering amount of monoammonium phosphate was added at a ratio between about 1:1 to 125:1 sodium nitrate to monoammonium phosphate to enhance the preservation of the pseudomonad at 25° C.

EXAMPLE 2

This example shows that the shelf-life of *Pseudomonas putida* NRRL-B-18118 was not adversely affected by NEODOL 91-6 over the concentration range of 0.5 to 5% when it is included as a component of the storage solution.

*Pseudomonas putida* NRRL-B-18118 was stabilized in a liquid according as described in Example 1. The stabilized pseudomonads were then mixed with the ethoxylated surfactant NEODOL 91-6 at the appropriate amount to arrive at the appropriate fixed concentration. The solutions were incubated at 25° C. At various times, aliquots were removed and plated on agar plates and the colony forming units (CFU) per mL were recorded. The results are shown in Table 1.

TABLE 1

| % NEODOL 91-6 | CFU/mL (time) | | | | |
| --- | --- | --- | --- | --- | --- |
| | Zero (h) | 1 Month | 3 Months | 5 Months | 7 Months |
| 0.5 | $1.4 \times 10^8$ | $5.0 \times 10^7$ | $1.0 \times 10^7$ | $3.0 \times 10^7$ | $6.0 \times 10^6$ |
| 1.0 | $1.4 \times 10^8$ | $5.0 \times 10^7$ | $1.5 \times 10^7$ | $1.0 \times 10^7$ | $1.0 \times 10^6$ |
| 5.0 | $1.4 \times 10^8$ | $5.0 \times 10^7$ | $1.4 \times 10^7$ | $1.0 \times 10^7$ | $1.0 \times 10^6$ |

The results show that there was only a two log decrease in viability of the pseudomonads over seven months when stored in the presence of NEODOL 91-6. The remaining 1 to $7 \times 10^6$ CFU/mL after seven months is useful for most bioremediation applications.

EXAMPLE 3

This example shows that the pseudomonads remained active in the presence of various amounts of NEODOL 91-6 and used motor oil.

The assay measured oxygen uptake of *Pseudomonas putida* NRRL-B-18118 in the presence 0.001 to 1.0% NEODOL 91-6 and 1% motor oil in a minimal media broth. The pseudomonads were suspended at $10^8$ CFU/mL and placed in a HATCH Model 2173B biological oxygen demand (BOD) analyzer at 25° C. Oxygen production was measured over a 48 hour time period. The results are shown in Table 2.

TABLE 2

| Time | NEODOL 91-6 | | | | | |
| --- | --- | --- | --- | --- | --- | --- |
| (h) | Control | 0.001% | 0.01% | 0.1% | 0.5% | 1.0% |
| 0 | 0 | 0 | 0 | 0 | 0 | 0 |
| 12 | 60 | 40 | 40 | 20 | 20 | 10 |
| 21 | 120 | 100 | 40 | 40 | 40 | 20 |
| 28 | 180 | 140 | 60 | 60 | 50 | 30 |
| 31 | 200 | 160 | 60 | 80 | 70 | 50 |
| 48 | 300 | 200 | 110 | 110 | 90 | 80 |

The results show that the pseudomonads remained functional over a 48 hour time period in the presence of the tested NEODOL 91-6 concentrations.

EXAMPLE 4

This example shows that in the presence of NEODOL 91-6 at a concentration of 0.1%, *Pseudomonas putida* NRRL-B-18118 was still able to grow and to consume used motor oil.

A cabinet-style parts washer from ChemFree Corporation (Norcross, Ga.) was used. The pseudomonad was combined with motor oil and NEODOL 91-6 in an aqueous solution to give a final concentration of $10^6$ CFU/mL of the pseudomonad, 10,000 ppm of the motor oil and 1% NEODOL 91-6. The temperature of the aqueous solution was 39° C. when both the heater and pump were engaged. Oil degradation was determined using the hexane gravimetric extraction method of HACH. The results are shown in Table 3.

TABLE 3

| | Day 0 | Day 1 | Day 2 | Day 3 | Day 4 | Day 5 | Day 6 | Day 7 |
| --- | --- | --- | --- | --- | --- | --- | --- | --- |
| Oil concentration (ppm) | 10,000 | 9,000 | 8,500 | 8,000 | 7,800 | 6,000 | 3,500 | 1,600 |
| CFU/mL | $10^6$ | $1.5 \times 10^9$ | $2.0 \times 10^9$ | $2.2 \times 10^9$ | $2.5 \times 10^9$ | $1.5 \times 10^9$ | $2.2 \times 10^9$ | $1.5 \times 10^9$ |

The results that in the presence of NEODOL 91-6 at a concentration of 0.1%, Pseudomonas putida NRRL-B-18118 was able to grow and consume 84% of the used motor oil in seven days. Thus, the pseudomonads were stable and active in the presence of NEODOL 91-6. The results further demonstrate that the composition is useful for bioremediation applications.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

I claim:

1. An aqueous composition containing a live bacterium of the genus Pseudomonas useful for degrading biological material comprising:
    (a) water;
    (b) at least one species of the Pseudomonas at between about $10^6$ to $10^{10}$ CFU per mL of the water;
    (c) an ethoxylate nonionic surfactant; and
    (d) an alkali metal nitrate in an amount between about 0.1% and 5% by weight of the water and optionally a buffering amount of monoammonium phosphate, and that the Pseudomonas species is preserved in a living form at 25° C., wherein the Pseudomonas is preserved in a living form over a period of time up to seven months prior to use in a bioreactor and is without an additional carbon, nitrogen, or mineral sources.

2. The composition of claim 1 wherein the Pseudomonas species is a *Pseudomonas putida*.

3. The composition of claim 2 wherein the *Pseudomonas putida* is selected from the group consisting of *Pseudomonas putida* NRRL-B-18118, *Pseudomonas putida* NRRL-B-15078, and mixtures thereof.

4. The composition of claim 1, 2 or 3 wherein a *Pseudomonas Fluorescens* is provided with a *Pseudomonas putida*.

5. The composition of claim 4 wherein the *Pseudomonas fluorescens* is deposited as NRRL-B-21658.

6. The composition of claim 1 wherein the alkali metal is sodium.

7. The composition of claim 1 wherein the monoammonium phosphate is included in a weight ratio between 1 to 1 and 125 to 1 alkali metal nitrate to monoammonium phosphate.

8. The composition of claim 1 wherein the ethoxylate nonionic surfactant is a linear alcohol ethoxylate.

9. The composition of claim 8 wherein the ethoxylate nonionic surfactant is a (C9–C11) alkyl alcohol ethoxylate.

10. The composition of claim 1 wherein the ethoxylate nonionic surfactant is at a concentration of between about 0.1% and 1%.

11. A method for degradation of a biological material comprising:
    (a) providing an aqueous composition which includes
        (1) water;
        (2) at least one species of a Pseudomonas at between about $10^6$ to $10^{10}$ CFU per mL of the water;
        (3) an ethoxylate nonionic surfactant; and
        (4) an alkali metal nitrate in an amount between about 0.1% and 5% by weight of the water and optionally a buffering amount of monoammonium phosphate, and that the Pseudomonas species is preserved in a living form at 25° C. over a period of time up to seven months without an additional carbon, nitrogen or mineral sources;
    (b) holding the composition at a temperature between about 8 and 35° C. to provide the preserved Pseudomonas species;
    (c) inoculating the preserved Pseudomonas species into the biodegradable material along with any of the additional carbon, nitrogen or mineral sources; and
    (d) degrading the biological material with the Pseudomonas species.

12. The method of claim 11 wherein the Pseudomonas species is a *Pseudomonas putida*.

13. The method of claim 12 wherein the *Pseudomonas putida* is selected from the group consisting of *Pseudomonas putida* NRRL-B-18118, *Pseudomonas putida* NRRL-B-15078, and mixtures thereof.

14. The method of claim 12 or 13 wherein a *Pseudomonas fluorescens* is provided with the *Pseudomonas putida*.

15. The method of claim 14 wherein the *Pseudomonas fluorescens* is deposited as NRRL-B-21658.

16. The method of claim 11 wherein the alkali metal is sodium.

17. The method of claim 11 wherein the monoammonium phosphate is included in a weight ratio between 1 to 1 and 125 to 1 alkali metal nitrate to monoammonium phosphate.

18. The method of claim 11 wherein the ethoxylate nonionic surfactant is a linear alcohol ethoxylate.

19. The method of claim 18 wherein the ethoxylate nonionic surfactant is a (C9–C11) alkyl alcohol ethoxylate.

20. The method of claim 11 wherein the ethoxylate nonionic surfactant is at a concentration of between about 0.1% and 1%.

21. The method of claim 11 wherein the biodegradable material is an organic waste.

22. The method of claim 21 wherein the organic waste is in the environment.

23. The method of claim 11 wherein the biological material is in an aqueous solution containing oil in a parts washer.

* * * * *